Sept. 22, 1970 W. D. LOFTUS 3,530,305

SINGLE PULSE GENERATOR

Filed April 1, 1969

INVENTOR
Wallace D. Loftus

BY
J. William Wigert Jr.
ATTORNEY

United States Patent Office 3,530,305
Patented Sept. 22, 1970

3,530,305
SINGLE PULSE GENERATOR

Wallace D. Loftus, Pittsburgh, Pa., assignor to Westinghouse Electric Corporation, Pittsburgh, Pa., a corporation of Pennsylvania Filed Apr. 1, 1969, Ser. No. 811,890
Int. Cl. H01h 9/56
U.S. Cl. 307—133 7 Claims

ABSTRACT OF THE DISCLOSURE

Herein disclosed is single pulse providing generator. A controlled switch is connected between a load and a transformer to an alternating current power source. Threshold responsive means are provided which, upon a predetermined alternating current source signal, activates means for closing the controlled switch after the alternating current power source voltage next passes through zero thereby permitting the passage of the alternating current to the load. When the alternating current next passes through zero means are provided to open the controlled switch and also to disable the threshold responsive means thereby permitting only a single pulse of electrical energy to the load. Additionally the single pulse may be provided in synchronization with a steady state alternating current signal additionally provided to the load.

BACKGROUND OF THE INVENTION

The present invention relates to a pulse generator and more particularly to a pulse generator which provides a single high energy pulse to a load.

In the testing of PN junction devices, for example, it is desirable to provide a single high energy pulse for testing the same. When such a junction device is tested continuously at high forward current conditions a great deal of power is dissipated in the junction region. The resulting self-heating adversely effects the parameters that are being measured. The self-heating effect may be eliminated by the use of pulse testing, that is, by providing only single pulses rather than a steady state current to the device being tested. The amount of energy provided to the junction being tested may be reduced considerably. Other applications requiring single, high energy pulses include the testing of junctions of any other semiconductor materials and any application requiring a single high current test or actuation pulse.

Electrical pulse generators per se are well known. Thus devices such as vacuum tube and transistor multivibrators, coaxial line and impedance discharge systems, and relay circuits, all of which are well known in the art, presently provide pulse signals. However, past and existing types are generally designed for low current outputs and for continuous pulse train outputs for use in electronic rather than power applications.

SUMMARY OF THE INVENTION

It is therefore an object of the present invention to provide an improved pulse generator for providing a single pulse output signal.

Another object of the present invention is to provide a pulse generator providing a single high energy output pulse.

Another object of the present invention is to provide a single pulse generator which may be synchronized with a steady state alternating current voltage so that a single high energy pulse may be super imposed upon the normal operating voltage.

Still another object of the present invention is to provide a pulse generator which is both reliable and easily constructed.

In accordance with the present invention, a controlled switching device is connected between a load and an alternating current power source. The controlled switching device desirably is connected to the alternating current power source through a variable transformer. A threshold responsive circuit is also connected to the alternating current power source, preferably through a transformer. The threshold responsive circuit, in response to a predetermined alternating current value is operable to close the controlled switching device after the alternating current power source voltage next passes through zero magnitude. The controlled switch remains on until the value of the alternating current goes to zero and thus a unidirectional pulse is provided to the load during this period. After approximately 180° means are provided for opening the controlled switch. Means are also provided for inhibiting the threshold responsive means so that the controlled switch will remain off until the threshold detecting circuit is manually operated again. Further, the single pulse provided to the load may be synchronized with and superimposed upon, the alternating current power source additionally supplied to the load.

BRIEF DESCRIPTION OF THE INVENTION

Figure 1:
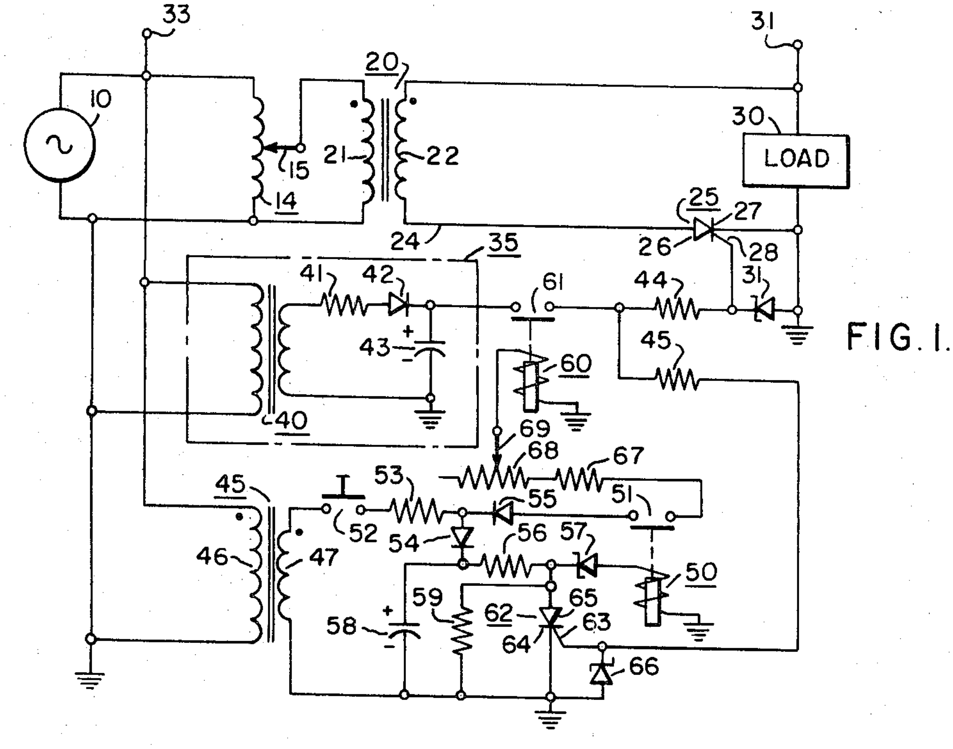
FIG. 1 is a schematic diagram of one embodiment of an improved single pulse generator.

Referring to FIG. 1 the winding 14 of a variable transformer 20 having a wiper arm 15 is connected to the output of an alternating current power source 10. The wiper arm 15 is connected to the primary winding 21 of pulse transformer 20. Transformer 20 has a secondary winding 22 which, as shown, is connected such that the waveform on the secondary winding 22 will be in phase with the waveform on the primary 21. One terminal of the secondary winding 22 of transformer 20 is connected by line 24 to a controlled switching device 25. Desirably, the controlled switching device 25 is a thyristor device having an anode 26, a cathode 27 and a gate input 28.

A load 30 is connected between the secondary winding 22 of transformer 20 and the controlled switching device 25. The load 30 may be, for example, a silicon carbide PN junction which is to be tested. Terminal 33, connected with the alternating current power source 10 is also provided as well as terminal 31 which is connected to the load 30. A connection may be made between these two terminals through suitable impedance means, to provide steady state alternating current from the alternating current power source 10 to the load 30, in addition to the single pulse provided by the operation of controlled switching device 25. Transformer 40, resistor 41, diode rectifier 42 and capacitor 43 which are connected to the alternating current source 10 comprise a DC power supply 35 which is connected to the gate input 28 of thyristor 25 through resistor 44 and switch contacts 61. Thus when the contacts of the switch 61 are closed a gate signal is provided to thyristor 25 to energize and "close" the same.

Transformer 45 has a primary winding 46 connected with the alternating current supply 10. The secondary winding 47 is coupled, as indicated, such that the output therefrom is in phase with the input to primary winding 46, and hence in phase with the output from the secondary winding 22 of transformer 20. The secondary winding 47 is coupled with the operation coil of switch or relay 50 through manually operable switch 52, resistor 53, diode 54, resistor 56 and Zener diode 57 as shown. A capacitor 58 is connected from the cathode of the diode 54 and to the secondary winding 47. Also, resistor 59 is connected across the Zener diode 57 and the relay operational coil 50.

When energized relay or switch 50 acts to close contacts 51. Since diode 55 is provided in series with the contacts 51, when the output from the secondary winding 47 of transformer 45 passes through zero and goes negative, current will flow through the line including the diode 55, closed contacts 51, resistor 67, and variable resistor 68, movable wiper arm 69, and the operation coil of relay 60 thereby energizing the same. Thus when energized, the relay 60 is operable to close the contacts 61 which is connected with the DC voltage supply 35. This results in a gate signal to the gate input 28 of thyristor 25 and also a gate signal through resistor 45 to gate input 63 of thyristor 62.

Thyristor 62 has an anode 65 which is connected to one terminal of the Zener diode 57 and a cathode 64 which is connected to ground.

Zener diode 66 is connected between the gate input 63 and cathode 64 of the thyristor 62 and Zener diode 31 is connected between the gate input 28 and cathode 27 of thyristor 25 to prevent inadvertent application of excessive voltages of either polarity to the respective thyristor gates.

The combination of the Zener diode 57 and relay 50 acts as a threshold responsive device. The Zener diode 57 has a certain breakdown voltage associated with it. If this voltage is exceeded it goes from a high to a low impedance state and current is conducted through it. Typically this voltage is approximately 4.7 volts, here positive. Switch 50 desirably is fast acting and of the reed or mercury-wetted contact types. Only a very small amount of current, typically 9.75 ma. is required to close or "pull-in" the contacts. Once closed, however, only a small, or "hold-in," current is required to maintain the contacts closed. Also associated with switch 50 is a pull-in and hold-in voltage.

In the particular embodiment shown the pull-in current is reached almost instantaneously when Zener diode 57 breaks down. However, it may be seen that with the addition of appropriate impedances and a less responsive switch 50, Zener diode 57 could be removed entirely, making the threshold responsive device responsive to a threshold current and not a voltage. The operation of the improved single pulse generator is as follows.

To begin the sequence manually operable switch 52 is closed. Since switch 52 is closed randomly it may close during any part of the resulting output cycle from the secondary winding 47. Diode 54 will permit the flow of current only during the positive part of the cycle, however. Thus, when switch 52 is closed during a negative excursion of 47 voltage no current flows until the next succeeding positive excursion of the output across the secondary winding 47 which, since the secondary winding in phase with the secondary winding 22 of transformer 20, occurs during the time that a positive output voltage appears across the secondary winding 22. When the value of the voltage across winding 47 exceeds the breakdown voltage of the Zener diode 57, Zener diode 57 will conduct, thereby allowing current to flow through the relay or switch 50, closing the contacts 51.

When the voltage across the winding 47 goes from a positive value through zero and becomes negative, current will be conducted through the diode 55, through the closed terminals 51, through the resistors 67 and 68 and through relay or switch 60. When this happens and the pull-in current of relay 60 is exceeded, contact 61 is closed thus providing a gate signal by the DC voltage supply 35 to the gate inputs 28 and 63 of thyristors 25 and 62 respectively to energize the same.

When thyristor 25 is fired the load 30 is connected to the secondary winding 22 of transformer 20. Since the winding 22 has a voltage associated with in phase with the voltage across secondary winding 47, it may be seen that a negative voltage will appear across the load 30 so long as the voltage across winding 47 remains negative. Once the voltage across winding 47 goes positive again the diode 55 prevents current from flowing through relay or switch 60.

Closing of the contact 61 also results in a gate input signal to the gate input 63 of thyristor 62 causing that thyristor to fire and short-circuit the Zener diode 57 and the operation coil of relay 50. The shorting of the operation coil of relay 50 is the disarming or inhibiting event. When this occurs both relays 50 and 60 are deenergized and contacts 51 and 61 are opened. Hence it may be seen that thyristor 25 will remain energized only until the next positive excursion of the voltage across the secondary winding 22 since the operation of the relay 50 is inhibited due to the short circuit. The short-circuit through thyristor 62 is maintained until the pushbutton switch 52 is released, which is the final event of the sequence.

Capacitor 58, which discharges through a voltage divider comprising resistors 56 and 59, is utilized in maintaining the thyristor 62 conducting during each of the negative portions of the voltage across the secondary winding 47. Thus it may be seen that the relay 50 will be shorted out no matter how long the manually operated switch 52 held down and only one single pulse is provided across the load 30. Resistors 56 and 59 have impedance value such that the voltage at their junction exceeds the breakdown voltage of the Zener diode 57 plus the voltage of the relay 50 to close the contacts of the same. Thus the relationship is that the ratio of the resistor 59 to the combination of the resistor 59 and the resistor 56 times the peak capacitor 58 voltage must be greater than the breakdown voltage of Zener diode 57 plus the pull-in voltage associated with the relay 50.

The purpose of the Zener diode 57, in addition to acting as a threshold responsive device, is to ensure that the relay 50 will fall out when thyristor 62 is conducting. This may be explained as follows. The relay 50 has a certain voltage associated with it required to close or "pull-in" contacts 51. However, once the contacts are closed a much smaller voltage, or "hold-in" voltage, is required to maintain the contacts in their closed position. Thus, the very small voltage across the conducting thyristor 62 might otherwise be sufficient to maintain the relay 50 energized and the contacts closed. Thus the Zener diode 57 insures that no current will flow through the relay 50 as a result of this slight voltage across conducting thyristor 62.

The magnitude of the pulse across the load 30 is determined by the position of the wiper arm 15 of transformer 14. The greater the step-up of transformer 20, the greater the magnitude of the pulse across the load 30.

If terminal 33 is connected to terminal 31 through suitable impedance means, a steady state AC current will be provided through the load 30 from the alternating current power source 10. It may be seen that by actuating the above-described single pulse generator whenever the operable switch 52 is closed a single pulse will be superimposed during a portion of the steady state alternating current from the power source 10.

The variable resistor 68 operates as an adjustable pulse width control. As previously noted with regard to relay 50, a certain current through the relay coil 60 is required before it will "pull-in" and close contact 61. It may be seen that the larger the value of the resistance 68, the longer it will take for this current to build-up through the coil. Hence the variable resistor 68 may be utilized to vary in time that point at which relay 60 pull-in occurs which will alter the width of a pulse across the load 30 since the pulse is terminated at the same time regardless of where it begins.

Figure 2:
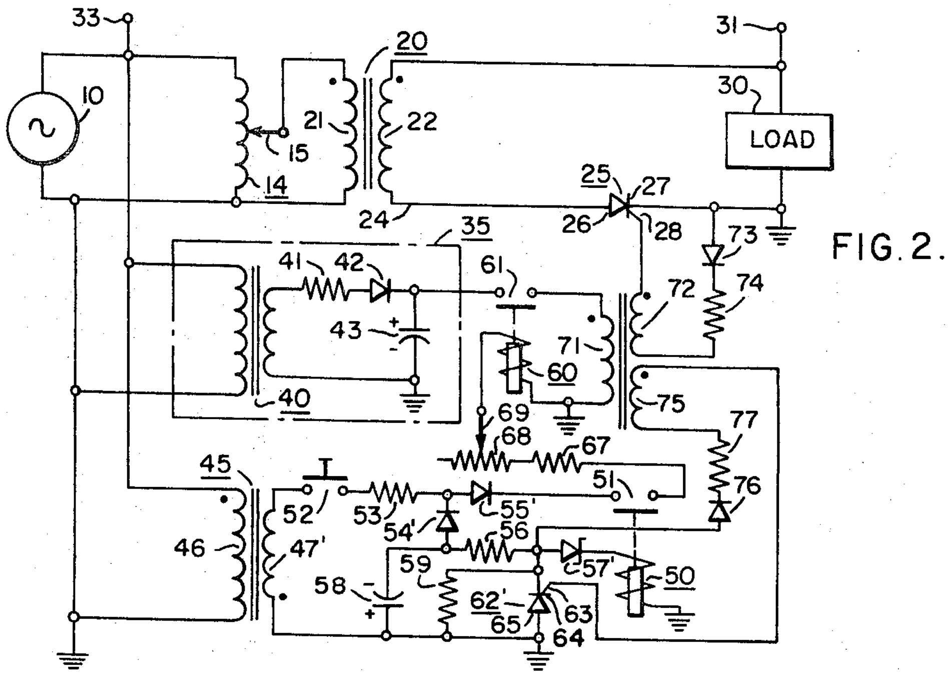
FIG. 2 is a schematic diagram of another embodiment of an improved single pulse generator.

A second embodiment of the present invention is illustrated in FIG. 2. The circuit shown therein is identical with the circuit of FIG. 1 except as noted. Here the secondary winding 47' is arranged such that it is 180° out of phase with the secondary winding 22 of transformer 20. The direction of diodes 54', 55', Zener diode 57' and thyristor 62' are reversed from those of FIG. 1. Furthermore, Zener diodes 66 and 31 of FIG. 1 are eliminated.

The output from the DC power source 35 is sent through a primary winding 1. A first secondary winding 72 is connected across the gate input 28 and cathode 27 of thyristor 25 through current limiting resistor 74 and blocking diode 73. The output from secondary winding 72 is in phase with that from the primary winding 71. A second, secondary winding 75 is connected between the gate input 63 and cathode 64 of thyristor 62' via blocking diode 76 and current limiting resistor 77. The secondary winding 75 is in phase with the secondary winding 72.

In this circuit, relay 50 is energized when the negative output across the winding 47' exceeeds the breakdown voltage of the Zener diode 57' and the relay pull-in voltage 50. Thus the closure of contacts 61, which occurs during the next positive excursion of the voltage across primary winding 47', supplies a step voltage across the primary winding 71. The resulting voltage across the secondary winding 72 fires the thyristor 25 to provide the pulse across the load 30. The resulting voltage induced across secondary winding 75 fires the thyristor 62'.

The operation of the circuit in FIG. 2 is otherwise identical with that of FIG. 1. Although an additional transformer is required it is unnecessary to provide Zener diodes 31 and 66 in the circuit shown in FIG. 2.

Figure 2A:
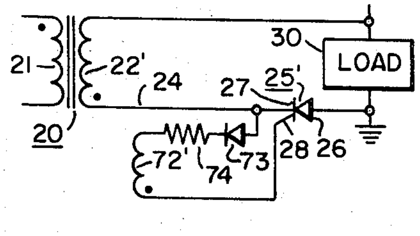
FIG. 2A shows another embodiment of one of the elements of the single pulse providing circuit shown in FIG. 2.

A further modification of the circuit shown in FIG. 2 permits the single pulse generator to provide a single positive pulse. Thus, referring to FIG. 2A the secondary winding 22' is 180° out of phase with the primary winding 21 and in phase with secondary winding 47' shown in FIG. 2, and thyristor 25' is connected to permit passage of current between the positive portion of the waveform across winding 22'. Furthermore the secondary winding 72' is coupled 180° out of phase with the primary winding 71 and thus the thyristor 25' is only conducting during the positive portion of the waveform across the secondary winding 22' and only the positive pulse will be provided across the load 30.

While there have been shown and described what are at present considered to be the preferred embodiments of the invention modifications thereto will readily occur to those skilled in the art. It is not desired therefore that the invention be limited to the specific arrangements shown and described and it is intended to cover all such modifications as fall within the true spirit and scope of the invention.

I claim as my invention:

1. Single electrical pulse providing apparatus comprising:

a first controlled switch operable to connect an alternating current power supply with a load;

first means operable to open and close said first controlled switch;

second means responsive to a first predetermined magnitude of said alternating current power supply voltage operable to cause said first means to open said first controlled switch after said alternating current power supply voltage next passes through a second predetermined magnitude;

third means for closing said first controlled switch when said alternating current power supply voltage passes through a third predetermined magnitude;

fourth means for inhibiting said second means before the value of said alternating current power supply voltage reaches said first predetermined magnitude.

2. Apparatus as in claim 1 wherein said first controlled switch includes a control gate for operating the same.

3. Apparatus as in claim 2 wherein said first means comprises a gate energization power supply and a second controlled switch operable to connect said gate energization power supply with said control gate.

4. Apparatus as in claim 1 including fifth means for varying the magnitude of the resulting load pulse signal.

5. Apparatus as in claim 3 wherein said second means comprises:

a transformer coupled with said alternating current power source;

a threshold responsive device operable to close said second controlled switch;

a switch for connecting said transformer with said threshold responsive device.

6. Apparatus as in claim 1 including variable means for varying the time at which said first controlled switch is opened after said alternating current power supply voltage passes through said second predetermined magnitude.

7. Apparatus as in claim 5 wherein said inhibiting means comprises a third controlled switch, including a control gate, connected in parallel with said threshold responsive device and means for connecting said gate energization power supply to said control gate to close said switch to short out said threshold responsive device.

References Cited

UNITED STATES PATENTS

| | | |
|---|---|---|
| 3,283,177 | 11/1966 | Cooper. |
| 3,443,204 | 5/1969 | Baker. |
| 3,458,800 | 7/1969 | Bross. |

ROBERT K. SCHAEFER, Primary Examiner

T. B. JOIKE, Assistant Examiner